United States Patent [19]

Kamiya et al.

[11] Patent Number: 4,554,990
[45] Date of Patent: Nov. 26, 1985

[54] ANTI-SLIP SYSTEM FOR WHEELED VEHICLE

[75] Inventors: Tadashi Kamiya, Niiza; Kiyotaka Hayashi, Urawa, both of Japan

[73] Assignee: Honda Giken Kogyo Kabushiki Kaisha, Tokyo, Japan

[21] Appl. No.: 540,427

[22] Filed: Oct. 7, 1983

[30] Foreign Application Priority Data

Oct. 12, 1982 [JP] Japan .................. 57-178692
Oct. 12, 1982 [JP] Japan .................. 57-178693

[51] Int. Cl.⁴ ............................. B60K 27/00
[52] U.S. Cl. ........................ 180/197; 180/219; 303/96; 303/97
[58] Field of Search ............ 180/197, 219, 224; 303/96, 97

[56] References Cited

U.S. PATENT DOCUMENTS

| | | | |
|---|---|---|---|
| 3,680,655 | 8/1972 | Beyerlein et al. | 303/96 |
| 3,779,331 | 12/1973 | Burckhardt et al. | 180/197 |
| 3,802,529 | 4/1974 | Burckhardt et al. | 180/197 |
| 3,952,827 | 4/1976 | Drutchas | 180/197 |
| 4,095,147 | 6/1978 | Mountz | 180/197 X |
| 4,156,547 | 5/1979 | Marsh | 303/96 |
| 4,236,595 | 12/1980 | Beck et al. | 180/197 X |
| 4,432,430 | 2/1984 | Lind et al. | 180/197 |

FOREIGN PATENT DOCUMENTS

| | | |
|---|---|---|
| 1292769 | 10/1972 | United Kingdom . |
| 1372929 | 11/1974 | United Kingdom . |
| 1471074 | 4/1977 | United Kingdom . |
| 1515082 | 6/1978 | United Kingdom . |
| 2001784 | 2/1982 | United Kingdom . |

Primary Examiner—Joseph F. Peters, Jr.
Assistant Examiner—Charles R. Watts
Attorney, Agent, or Firm—Darby & Darby

[57] ABSTRACT

An anti-slip system is provided for a wheeled vehicle having a drive wheel and a driven wheel. A drive wheel speed sensor senses a rotational speed of the drive wheel to produce a first sensing signal while a driven wheel speed sensor senses a rotational speed of the driven wheel to produce a second sensing signal. A control unit is responsive to the first and second sensing signals for outputting a control signal representative of a slip rate of the drive wheel. A drive control device is responsive to the control signal for controlling drive force of the drive wheel to prevent a slip thereof.

5 Claims, 12 Drawing Figures

ANTI-SLIP SYSTEM FOR WHEELED VEHICLE

BACKGROUND OF THE INVENTION

1. Field of the Invention

This invention relates to an anti-slip system for controlling the rotational speed of a drive wheel of a vehicle.

2. Prior Art

Recently, in the manufacture of a wheeled vehicle such as a motorcycle and a motor car, an engine portion and a frame or chassis have been improved to enhance a running performance of the vehicle on bad roads such as a muddy road and a snow-laden road. A tire traction, which is the ability to convert a rotational force of the drive wheel into a propelling force, can be enhanced to a certain extent by improving a pattern of the tire tread. Despite such improvements, when abruptly accelerating the vehicle, the drive wheel is still subjected to slip, so that the maximum tire traction can not be achieved. Thus, the drive wheel runs idle under such a condition so that a fuel consumption rate is worsened. It is known in the art that the maximum tire traction can be obtained when a slip rate of the drive wheel is at a predetermined level, for example, 5 to 10%.

SUMMARY OF THE INVENTION

It is therefore an object of this invention to provide an anti-slip system for a wheeled vehicle by which the slip of a drive wheel of the vehicle is controlled to the optimum level to produce the maximum tire traction.

According to the present invention, there is provided an anti-slip system for a wheeled vehicle having a drive wheel and a driven wheel which system comprises a drive wheel speed sensor for sensing a rotational speed of the drive wheel to produce a first sensing signal; a driven wheel speed sensor for sensing a rotational speed of the driven wheel to produce a second sensing signal; a controller comprising a control unit responsive to the first and second sensing signals for outputting a control signal representative of a slip rate of the drive wheel; and drive control means responsive to the control signal for controlling a drive force of the drive wheel to prevent a slip thereof.

DESCRIPTION OF THE PREFERRED EMBODIMENTS OF THE INVENTION

Figure 1:
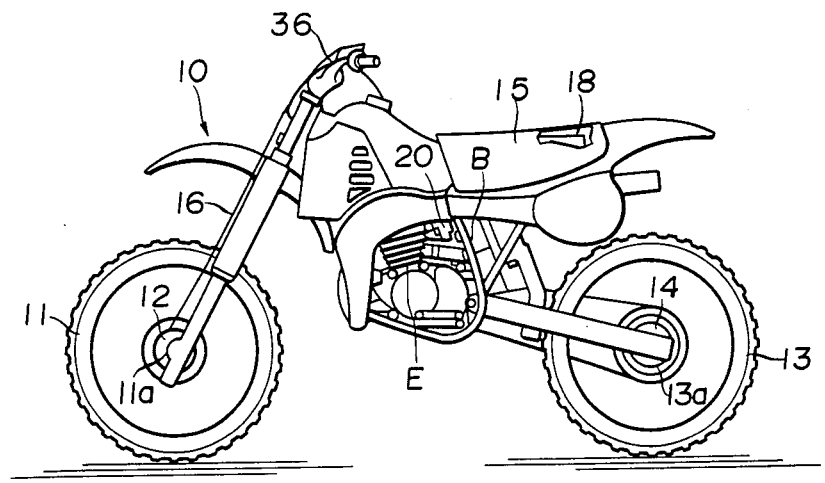
FIG. 1 is a side-elevational view of a motorcycle incorporating an anti-slip system provided in accordance with the present invention.
Figure 2:
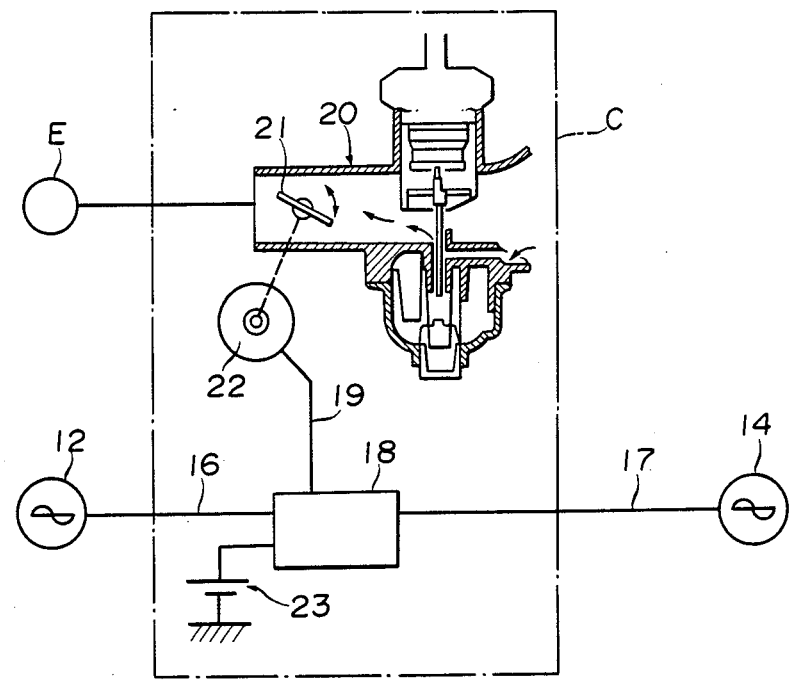
FIG. 2 is a diagrammatic illustration showing the anti-slip system.

FIG. 1 shows a motorcycle 10 provided with an anti-slip system according to the present invention. A front wheel speed sensor 12 is mounted on a front axle portion 11a for sensing the rotational speed of a front or driven wheel 11 of the motorcycle 10 while a rear wheel speed sensor 14 is mounted on a rear axle portion 13a for sensing the rotational speed of a rear or drive wheel 13. Each of the front and rear wheel speed sensors 12 and 14 is of the conventional type designed to produce a sinusoidal wave of which frequency varies in proportion to the rotational speed of a respective one of the front and rear wheels 11 and 13.

A control system C is provided on a frame B of the motor cycle 10 for controlling an output of an engine E of the motorcycle 10 in accordance with the output signals of the front and rear wheel speed sensors 12 and 14 representing the rotational speeds of the front and rear wheels 11 and 13, respectively.

The control system C comprises a control unit 18 mounted on the frame B of the motorcycle 10 below a seat 15 and electrically connected to respective output terminals of the front and rear wheel speed sensors 12 and 14 through electrical wires 16 and 17, and further includes DC motor 22 electrically connected via an electrical wire 19 to an output terminal of the control unit 18 for controlling the operation of a throttle valve 21 of a carburetor 20 to control the flow of a fuel-air mixture into the engine E.

The control unit 18 is responsive to the output signal of the front wheel speed sensor 12 to calculate a speed Vb of running of the vehicle (estimated speed of the vehicle) and is also responsive to the output signal of the rear wheel speed sensor 14 to calculate a peripheral speed Vr of the rear wheel 13. The control unit 18 calculates a rate r of slip of the rear wheel 13 in accordance with the estimated vehicle speed Vb and the peripheral speed Vr. The control unit 18 controls the operation of the motor 22 in accordance with the slip rate r to control the operation of the throttle valve 21 so that the flow of the fuel-air mixture into the engine E is controlled. A throttle grip (not shown) of the motorcycle 10 is operatively connected to the throttle valve 21 to control the flow rate of the fuel-air mixture in a well-known manner. A battery 23 of the motorcycle serves as a power source for the control unit 18.

The control unit 18 will now be described in more detail with reference to FIGS. 3 and 4.

Figure 3:
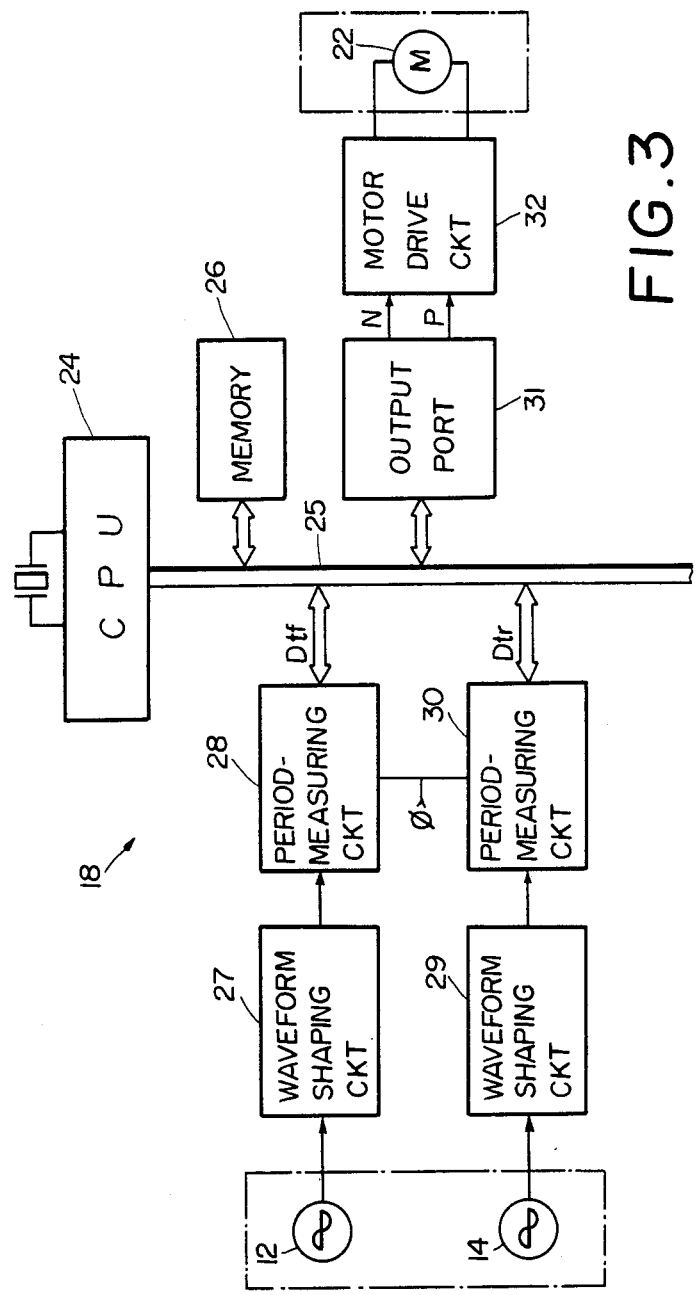
FIG. 3 is a block diagram of the anti-slip system.

FIG. 3 shows a block diagram of the control unit 18. A memory 26 is connected to a bus 25 of a central processing unit (CPU) 24 such as a microprocessor. The CPU 24 operates in accordance with a program stored in the memory 26. The output signal of the front wheel speed sensor 12 in the form of a sinusoidal wave is applied to a waveform shaping circuit 27 by which the sinusoidal wave is amplified and converted into a rectangular wave. An output signal of the waveform shaping circuit 27 in the form of the rectangular wave is applied to a period-measuring circuit 28 such as a counter. Clock pulses $\phi$ are applied to the period-measuring circuit 28 at predetermined time intervals, and the period-measuring circuit 28 functions to count up the clock pulses $\phi$ during each cycle of the rectangular wave to output digital period date Dtf which is proportional to a period Tf of the sinusoidal wave outputted from the front wheel speed sensor 12. A waveform shaping circuit 29 and a period-measuring circuit 30 are similar in construction to the waveform shaping circuit 27 and the period-measuring circuit 28, respectively. Therefore, the period-measuring circuit 30 outputs digital period data Dtr which is proportional to a period Tr of the sinusoidal wave outputted from the rear wheel speed sensor 14.

An output port 31 produces a binary signal N for closing the throttle valve 21 and a binary signal P for opening the throttle valve 21 under the control of the CPU 24. A motor drive circuit 32 drives the motor 22 in its normal and reverse directions, respectively, in accordance with the binary signals N and P. More specifically, when the binary signal N goes to the 1 state, the drive circuit 32 drives the motor 22 for rotation in its normal direction to actuate the throttle valve 21 in its closing direction. Also, when the binary signal P is rendered "1", the drive circuit 32 drives the motor 22 for rotation in its reverse direction to actuate the throttle valve 21 in its opening direction.

Figure 4:
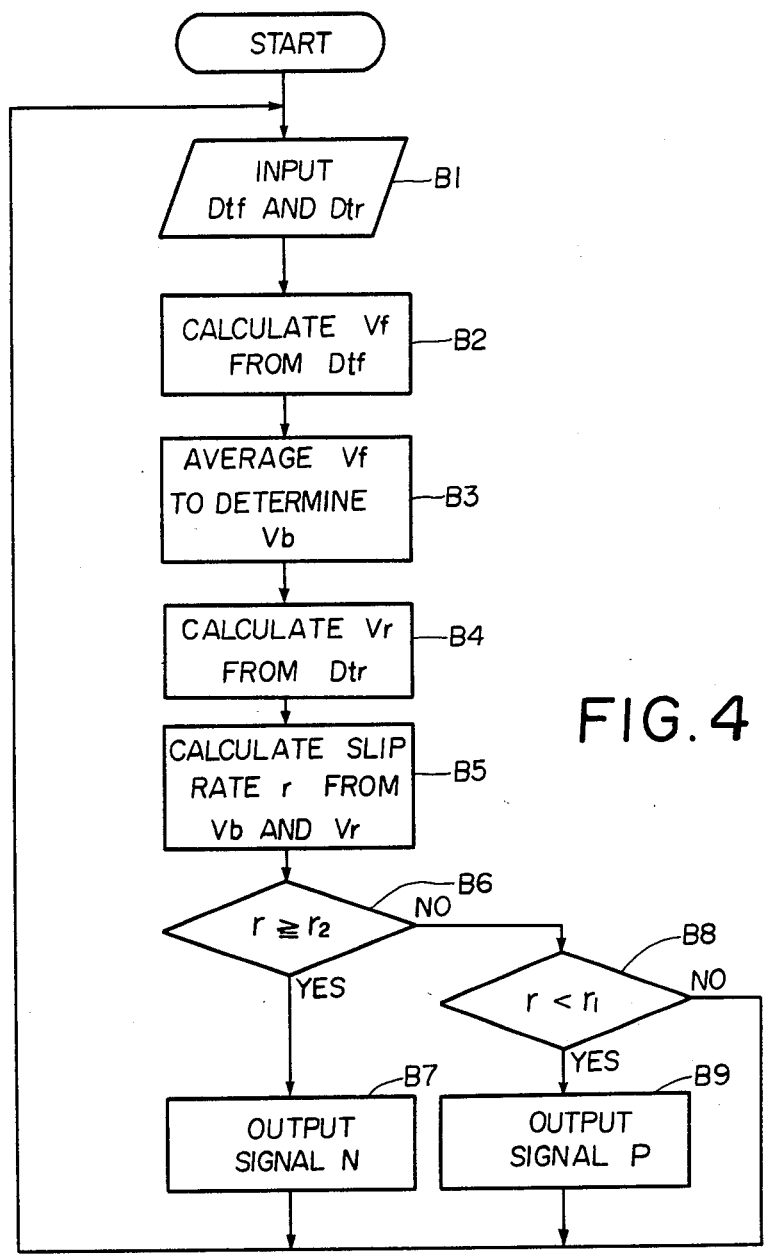
FIG. 4 is a flow chart of a program for carrying out the anti-sliip operation.

FIG. 4 shows a flow chart of the program executed by the CPU 24. The operation of the CPU 24 will now be described with reference to this flow chart. The program is periodically executed at predetermined time intervals sufficiently short to accurately carry out the anti-slip operation.

When the execution of the program is started, in Block B1, the CPU 24 inputs thereto the output data Dtf of the period-measuring circuit 28 corresponding to the period Tf of the output signal of the front wheel speed sensor 12 and the output data Dtr of the period-measuring circuit 30 corresponding to the period Tr of the output signal of the rear wheel speed sensor 14. Then, in Block B2, the CPU 24 calculates the peripheral speed Vf of the front wheel 11 from the period data Dtf. More specifically, since the peripheral speed Vf is proportional to a reciprocal number of the period data Dtf, the CPU 24 calculates the peripheral speed Vf by multiplying the reciprocal number of the period data Dtf by a predetermined constant stored in the memory 26. Then, in Block B3, the CPU 24 averages the peripheral speed Vf by a filtering program stored in the memory 26 to determine the estimated vehicle speed Vb. Then, in Block B4, the CPU 24 calculates the peripheral speed Vr of the rear wheel 13 from the period data Dtr in the same manner as described for Block B2. Then, in Block B5, the CPU 24 calculates the slip rate r of the rear wheel 13 from the estimated vehicle speed Vb and the peripheral speed Vr of the rear wheel 13. The slip rate r is represented by the following formula (1):

$$r = (Vr - Vb)/Vb \tag{1}$$

Then, in Block B6, the CPU 24 determines whether the slip rate r so obtained is greater than a second reference slip rate $r_2$ used as a reference for the anti-slip operation. If the result is that r is greater than or equal to $r_2$ ($r \geq r_2$), the processing proceeds to Block B7 in which the CPU 24 maintains the binary signal N in the 1 state via the output port 31 for a predetermined time period which is shorter than one cycle of execution of the control program, so that the motor 22 is driven through the motor drive circuit 32 to rotate in its normal direction thereby closing the throttle valve 21 through a selected angle. Then, the processing returns to Block B1. On the other hand, in Block B6 mentioned above, if the CPU 24 determines that the slip rate r is less than the second reference slip rate $r_2$, the processing proceeds to Block B8 in which the CPU 24 determines whether the slip rate r is less than a first reference slip rate $r_1$ which is less than the second reference slip rate $r_2$. If the result is that the slip rate r is less than the first reference slip rate $r_1$, the processing proceeds to Block B9. In Block B9, if the throttle valve 21 is not in a position set by the manipulation of the throttle grip, the CPU 24 holds the binary signal P in the 1 state through the output port 31 for a predetermined time period to rotate the motor 22 in its reverse direction, thereby opening the throttle valve 21 to the above-mentioned position set by the manipulation of the throttle grip. Then, the binary signal P is rendered "0", and the processing returns to Block B1. On the other hand, in Block B8 mentioned above, if the CPU 24 determines that the slip rate r is greater than or equal to the first reference slip rate $r_1$ ($r \geq r_1$), the processing returns to Block B1 without moving the throttle valve 21. Also, in Block B9, if the throttle valve 21 is in the position set by the manipulation of the throttle grip, the processing returns to Block B1.

With this anti-slip system, when the motorcycle 10 is accelerated during the running by the manipulation of the throttle grip so that the peripheral speed Vr of the rear wheel 13 becomes greater than the vehicle speed Vb (estimated vehicle speed) to cause the rear wheel 13 to slip, the control unit 18 regulates the throttle valve 21 through the motor 22 in accordance with the slip rate r calculated from the vehicle speed Vb and the peripheral speed Vr of the rear wheel 13, thereby controlling the flow of the fuel-air mixture into the engine E to the optimum level. In this case, when the slip rate r is relatively great, the flow of the fuel-air mixture to the engine E is considerably reduced to lower the peripheral speed Vr of the rear wheel 13. Also, when the slip rate r is relatively small, the flow rate is slightly reduced. Thus, the output of the engine E is lowered in accordance with the calculated slip rate r when the rear wheel 13 is subjected to slip, so that the peripheral speed Vr of the rear wheel 13 is correspondingly reduced to prevent the slip. Therefore, when the motorcycle 10 is either started or accelerated even on a bad road, a sufficient tire traction of the rear wheel 13 can be obtained to achieve a stable acceleration of the motorcycle 10. Conventionally, when the rear wheel is subjected to slip, the driver manipulates the throttle grip in a delicate manner to lower the rotational speed of the rear wheel. With this anti-slip system, however, the slip of the rear wheel 13 can be suitably prevented without resort to the above-mentioned delicate manipulation of the throttle grip. Therefore, the driver can operate the vehicle in a stable manner even on bad roads at the time of acceleration. In addition, the rear wheel 13 is prevented from running idle so that a fuel consumption rate is improved.

Figure 5:
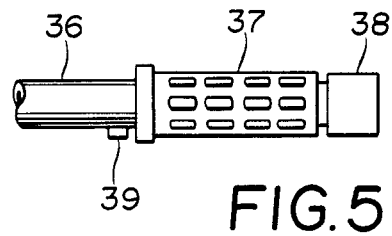
FIG. 5 is a fragmentary view of a handle portion of the motorcycle, showing a position sensor incorporated in a modified anti-slip system.
Figure 6:
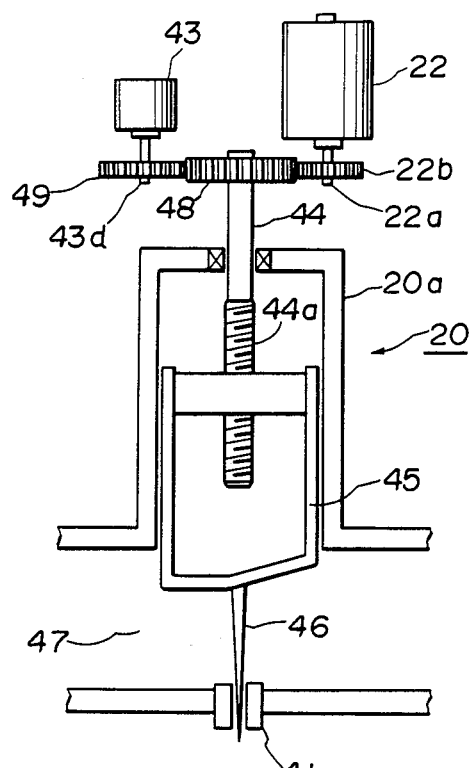
FIG. 6 is a diagrammatic view of a carburetor of the motorcycle incorporating the modified anti-slip system.

A modified anti-slip system will now be described particularly referring first to FIG. 1 for convenience' sake. The anti-slip system in this embodiment comprises a front wheel speed sensor 12 for sensing the rotational speed of a front or driven wheel 11 of a motorcycle 10 and a rear wheel speed sensor 14 for sensing the rotational speed of a rear or drive wheel 13 of the motorcycle 10, as described above for the anti-slip system in the preceding embodiment. Each of the front and rear wheel speed sensors 12 and 14 are of the same construction as each of the front and rear wheel speed sensors 12 and 14 in the preceding embodiment. As best shown in FIG. 5, a position sensor 38 is mounted on a distal end of a handle bar 36 for sensing an angular position of a throttle grip 37, the position sensor 38 being hereinafter referred to as "throttling amount sensor". The throttling amount sensor 38 comprises a potentiometer having a rotating shaft on which a sliding contact is mounted, the rotating shaft being operatively connected to the throttle grip 37 for angular movement therewith. A mode switch 39 is mounted on the handle bar 36 adjacent to the throttle grip 37 for setting an anti-slip mode. This mode switch 39 may be mounted on a left-hand side of the handle bar 36 adjacent to a clutch grip for being actuated to set the anti-slip mode when manipulating the throttle grip 37. As shown in FIG. 6, a carburetor 20 of the motorcycle 10 comprises a DC motor 22 for adjusting the opening of a main jet 41, i.e., the throttling amount of the carburetor 20, and a carburetor throttling sensor 43 for sensing the actual throttling amount of the carburetor 20. The carburetor 20 also comprises a body 20a, a bolt 44 rotatably mounted on the body 20a, a piston 45 threaded on a thread portion 44a of the bolt 44 so as to move along the bolt 44 upon angular movement thereof, and a needle 46 mounted on the piston 45. Upon angular movement of the bolt 44, the opening of the main jet 41 is varied so that the amount of the fuel fed to an intake passage 47 is correspondingly varied. A gear 22b is mounted on an output shaft 22a of the motor 22 and is in mesh with a gear 48 mounted on the bolt 44. With this construction, the rotation of the motor 22 causes the angular movement of the bolt 44.

The carburetor throttling sensor 43 comprises a potentiometer having a rotating shaft 43d on which a sliding contact is mounted. A gear 49 is mounted on the rotating shaft 43d and is in mesh with the gear 48 so that the rotating shaft 43d is angularly moved in synchronism with the bolt 44.

Figure 7:
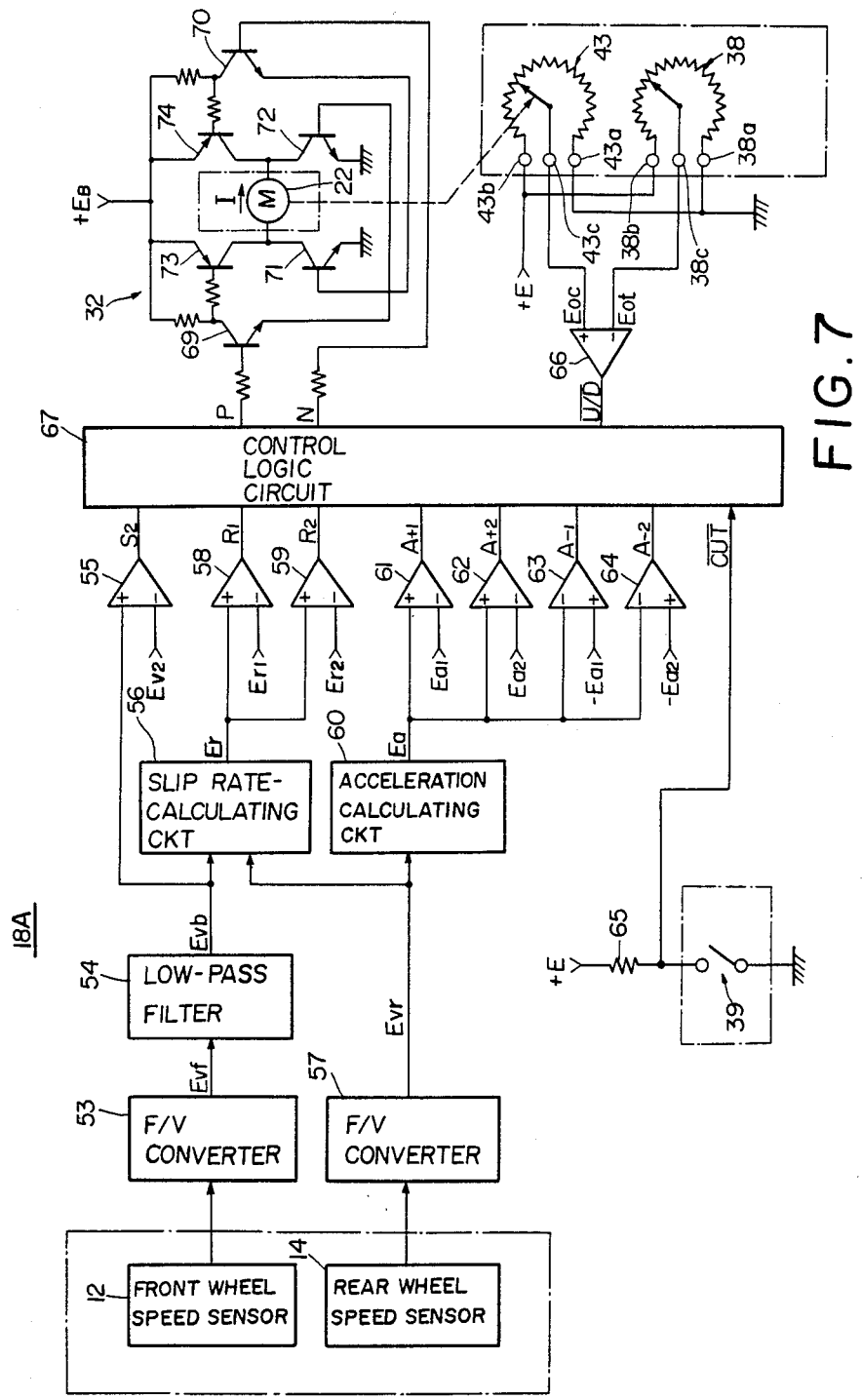
FIG. 7 is a block and circuit diagram of the modified anti-slip system.

A control unit 18 is mounted on a frame B of the motorcycle 10 below a seat 15 and electrically connected to the above-mentioned sensors 12, 14, 38 and 43, the mode switch 39 and the motor 22 through electrical wires. The control unit 18 comprises a control circuit 18A which will now be described with reference to FIG. 7 showing a block and circuit diagram thereof.

The output signal of the front wheel speed sensor 12 is applied to F/V converter 53 (frequency-to-voltage converter) which in turn outputs a signal representative of voltage Evf proportional to the peripheral speed Vf of the front wheel 11. The output voltage Evf is applied to a low-pass filter 54 which makes the voltage Evf smooth and outputs a signal representative of voltage Evb corresponding to the vehicle speed Vb (estimated vehicle speed) of the motorcycle 10. The output voltage Evb is applied to a first comparator 55 in which the voltage Evb is compared with voltage Ev2 representing a reference vehicle speed $V_2$. The reference vehicle speed $V_2$ indicates a mode-switching level of the anti-slip operation since the anti-slip operation should be carried out in either a low speed-running mode or a high speed-running mode in accordance with the running speed of the vehicle. Therefore, when the vehicle speed Vb is greater than or equal to the reference vehicle speed $V_2$ (Vb≧$V_2$), which means that the anti-slip operation should be carried out in the high speed-running mode, the comparator outputs a binary signal $S_2$ in the state of 1. The output voltage Evb of the low-pass filter 54 is also applied to slip rate-calculating circuit 56 as hereinafter more fully described.

On the other hand, the output signal of the rear wheel speed sensor 14 is applied to F/V converter 57 which is identical in construction to the F/V converter 53. Therefore, the F/V converter 57 is responsive to the output signal of the rear wheel speed sensor 14 to output a signal representative of voltage Evr proportional to the peripheral speed Vr of the rear wheel 13. The output voltage Evr is applied to the slip rate-calculating circuit 56. The slip rate-calculating circuit 56 is responsive to this output voltage Evr and the output voltage Evb of the low-pass filter 54 representing the estimated vehicle speed Vb to output a signal representative of voltage Er proportional the slip rate r of the rear wheel 13.

More specifically, as described above in the preceding embodiment, the slip rate r is represented by the above-mentioned formula (1). Therefore, the voltage Er is represented by the following formula (2):

$$Er = (Evr - Evb)/Evb \qquad (2)$$

The output voltage Er of the slip rate-calculating circuit 56 is applied to both second and third comparators 58 and 59. The second comparator 58 compares the voltage Er with voltage Er1 representative of a first reference slip rate $r_1$ and outputs a binary signal R1 which is in the state of 1 only when the voltage Er is greater than or equal to the voltage Er1 (Er≧Er1). Also, the third comparator 59 compares the voltage Er with voltage Er2 representative of a second reference slip rate $r_2$ which is greater than the first reference slip rate $r_1$, and outputs a binary signal R2 which is in the state of 1 only when the voltage Er is greater than or equal to the voltage Er2 (Er≧Er2).

The output voltage Evr of the F/V converter 57 is also applied to acceleration-calculating circuit 60. The acceleration-calculating circuit 60 is responsive to the output voltage Evr to output a signal representative of voltage Ea proportional to the acceleration a of the rear wheel 13. More specifically, the acceleration-calculating circuit 60 comprises a differentiating circuit. The acceleration a is represented by the following formula (3):

$$a = \frac{1}{g} \frac{dVr}{dt} \qquad (3)$$

wherein g is gravitational acceleration.

Thus, the voltage Evr is differentiated, and the result obtained is multiplied by voltage corresponding to 1/g to obtain the voltage Ea. The output voltage Ea of the acceleration-calculating circuit 60 is applied to fourth to seventh comparators 61 to 64.

The fourth comparator 61 compares the voltage Ea with voltage Ea1 representative of a first reference acceleration $a_1$ of the rear wheel 13 and outputs a binary signal $A_{+1}$ which is in the state of 1 only when the voltage Ea is greater than or equal to the voltage Ea1 (Ea≧Ea1). Similarly, the fifth comparator 62 compares the voltage Ea with voltage Ea2 representative of a second reference acceleration $a_2$ of the rear wheel 13 which is greater than the first reference acceleration $a_1$, and outputs a binary signal $A_{+2}$ which is in the state of 1 only when the voltage Ea is greater than and equal to the voltage Ea2 (Ea≧Ea2). The sixth comparator 63 compares the voltage Ea with voltage −Ea1 representative of a first reference deceleration −a₁ of the rear wheel 13 and outputs a binary signal $A_{-1}$ which is in the state of 1 only when the voltage Ea is less than or equal to the voltage −Ea1 (Ea≦−Ea1). Similarly, the seventh comparator 64 compares the voltage Ea with voltage −Ea2 representative of a second reference deceleration −a₂ of the rear wheel 13 which is less than the first reference deceleration −a₁, and outputs a binary signal $A_{-2}$ which is in the state of 1 only when the voltage Ea is less than or equal to the voltage −Ea2 (Ea≦−Ea2).

One contact of the mode switch 39 is grounded while the other contact is connected to a power source +E via pull-up resistor 65. The other contact of the mode switch 39 is also connected to a control logic circuit 67 to apply a signal $\overline{CUT}$ thereto. When the mode switch 39 is opened to enable the anti-slip operation, the signal $\overline{CUT}$ is rendered "1". On the other hand, when the mode switch 39 is closed to disenable the anti-slip operation, the signal $\overline{CUT}$ is rendered "0".

One fixed terminal 38a of the throttling amount sensor 38 is grounded while the other fixed terminal 38b is connected to the power source +E. Similarly, one fixed terminal 43a of the carburetor throttling sensor 43 is grounded while the other fixed terminal 43b is connected to the power source +E. With this arrangement, voltage Eot proportional to the angular position of the throttle grip 37 appears at a sliding terminal 38c of the throttling amount sensor 38, the throttling amount determined by this angular position of the throttle grip 37 being hereinafter designated by Ot. Also, voltage Eoc proportional to the actual throttling amount of the carburetor 20 appears at a sliding terminal 43c of the carburetor throttling sensor 43, this actual throttling amount of the carburetor 20 irrespective of the manipulation of the throttle grip 37 being hereinafter referred to as "carburetor throttling amount Oc." The voltage Eot and the voltage Eoc are applied to an eighth comparator 66 which in turn outputs a binary signal $\overline{U/D}$. The binary signal $\overline{U/D}$ is rendered "1" when the voltage Eot is less than or equal to the voltage Eoc (Eot≦Eoc), that is to say, the throttling amount Ot is less than or equal to the carburetor throttling amount Oc. On the other hand, the binary signal $\overline{U/D}$ is rendered "0" when the voltage Eot is greater than the voltage Eoc (Eot>Eoc).

The requirements for the above-mentioned binary signals $R_1$, $R_2$, $A_{+1}$, $A_{+2}$, $A_{-1}$, $A_{-2}$, $\overline{U/D}$, $\overline{CUT}$ and $S_2$ to be in the 1 state are shown in the following Table:

TABLE

| Binary signal | Requirements for the 1 state |
|---|---|
| $R_1$ | slip rate r ≧ first reference slip rate $r_1$ |
| $R_2$ | slip rate r ≧ second reference slip rate $r_2$ |
| $A_{+1}$ | acceleration a ≧ first reference acceleration $a_1$ |
| $A_{+2}$ | acceleration a ≧ second reference acceleration $a_2$ |
| $A_{-1}$ | acceleration a ≦ first reference deceleration $-a_1$ |
| $A_{-2}$ | acceleration a ≦ second reference deceleration $-a_2$ |
| $\overline{U/D}$ | throttling amount Ot ≦ carburetor throttling amount Oc |
| $\overline{CUT}$ | when enabling the anti-slip operation |
| $S_2$ | estimated vehicle speed Vb reference speed V2 |

These binary signals $R_1$, $R_2$, $A_{+1}$, $A_{+2}$, $A_{-1}$, $A_{-2}$, $\overline{U/D}$, $\overline{CUT}$ and $S_2$ are applied to the control logic circuit 67. The control logic circuit 67 selectively outputs a binary signal P which is rendered "1" when the carburetor throttling amount Oc is increased, and also selectively outputs a signal N which is rendered "1" when the carburetor throttling amount Oc is decreased, as hereinafter more fully described. The signals P and N are applied to a motor drive circuit 32. The motor drive circuit 32 is of the conventional type comprising npn transistors 69 to 72 and pnp transistors 73 and 74, and the motor drive circuit 32 is energized by a battery +Eb. With this arrangement, when the signal P is rendered "1", the transistors 69, 72 and 73 are rendered operative so that current I flows through the motor 22 in a direction indicated by an arrow in FIG. 7 to rotate the motor 22 in its normal direction, thereby increasing the carburetor throttling amount Oc. On the other hand, when the signal N is rendered "1", the transistors 70, 71 and 74 are rendered operative so that current I flows through the motor 22 in a direction opposite to the arrow indicated in FIG. 7 to rotate the motor 22 in its reverse direction, thereby decreasing the carburetor throttling amount Oc.

Figure 8:
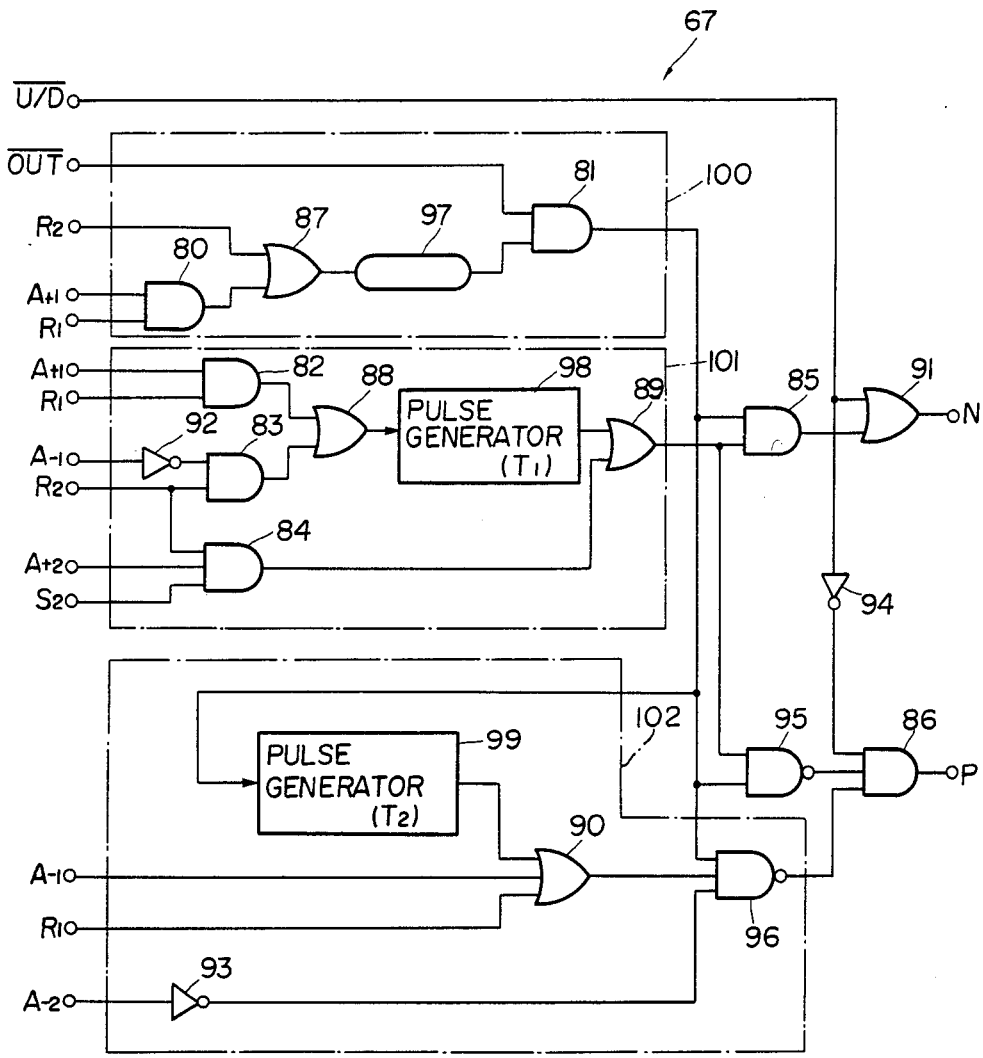
FIG. 8 is a logic block diagram of a control logic circuit of the modified anti-slip system.

The control logic circuit 67 will now be described in more detail with reference to FIG. 8.

Reference numerals 80 to 86 denote AND gates, reference numerals 87 to 91 OR gates, reference numerals 92 to 94 inverters, and reference numerals 95 and 96 NAND gates. Reference numeral 97 designates a delay circuit for delaying a leading edge of a signal inputted thereto. Reference numeral 98 denotes a pulse generator which is responsive to an input signal in the state of 1 to produce a pulse signal having period of $T_1$ and a duty factor of ½. Reference numeral 99 denotes a pulse generator which is responsive to an input signal in the state of 1 to produce a pulse signal having a period of $T_2$ and a duty factor of ½. Also, reference numeral 100 denotes a logic circuit for determining whether the anti-slip operation should be effected or not, and when the anti-slip operation is to be effected, the AND gate 81 of the logic circuit 100 outputs a signal in 1 state.

The anti-slip operation is carried out either when the slip rate r is greater than the first reference slip rate $r_1$ with the acceleration a being greater than the first reference acceleration $a_1$, or when the slip rate r is greater than the second reference slip rate $r_2$ which is greater than the first reference slip rate $r_1$. In addition, the first requirement is that the anti-slip system is set in the enabling mode by the mode switch 39. The delay circuit 97 of the logic circuit 100 serves to prevent the anti-slip operation from being intermittently effected at short time intervals.

A logic circuit 101 serves to determine whether the carburetor throttling amount Oc should be decreased. When the requirement for the decrease of the carburetor throttling amount Oc is met, the OR gate 89 outputs a signal in the state of "1". This requirement is met (1) when the slip rate r is greater than the first reference slip rate $r_1$ with the acceleration a being greater than the first reference acceleration $a_1$, or (2) when the slip rate r is greater than the second reference slip rate $r_2$ with the acceleration a being greater than the first reference deceleration $-a_1$, or (3) when the slip rate r is greater than the second reference slip rate $r_2$ with the acceleration a and the estimated vehicle speed Vb being greater than the second reference acceleration $a_2$ and the reference vehicle speed $V_2$, respectively. In the above-mentioned cases (1) and (2), the carburetor throttling amount 0c is gradually decreased, and in the case (3) the carburetor throttling amount 0c is decreased at a normal speed.

A logic circuit 102 serves to determine whether the carburetor throttling amount 0c should remain intact or be increased when the above-mentioned requirement for the decrease of the carburetor throttling amount 0c is not met. In this case, when the carburetor throttling amount 0c is determined to remain intact, the NAND gate 96 outputs a signal in the state of "0". On the other hand, when the carburetor throttling amount 0c is determined to be increased, the output signal of the NAND gate 96 is in the 1 state. The requirement for the carburetor throttling amount 0c to remain intact is met either when the slip rate r is greater than the first reference slip rate $r_1$ or when the acceleration a is less than the first reference deceleration $-a_1$. Also, the requirement for the increase of the carburetor throttling amount 0c is met when the acceleration a is less than the second deceleration $-a_2$. In other cases, the requirement for the gradual increase of the carburetor throttling amount 0c is met.

Figure 9:
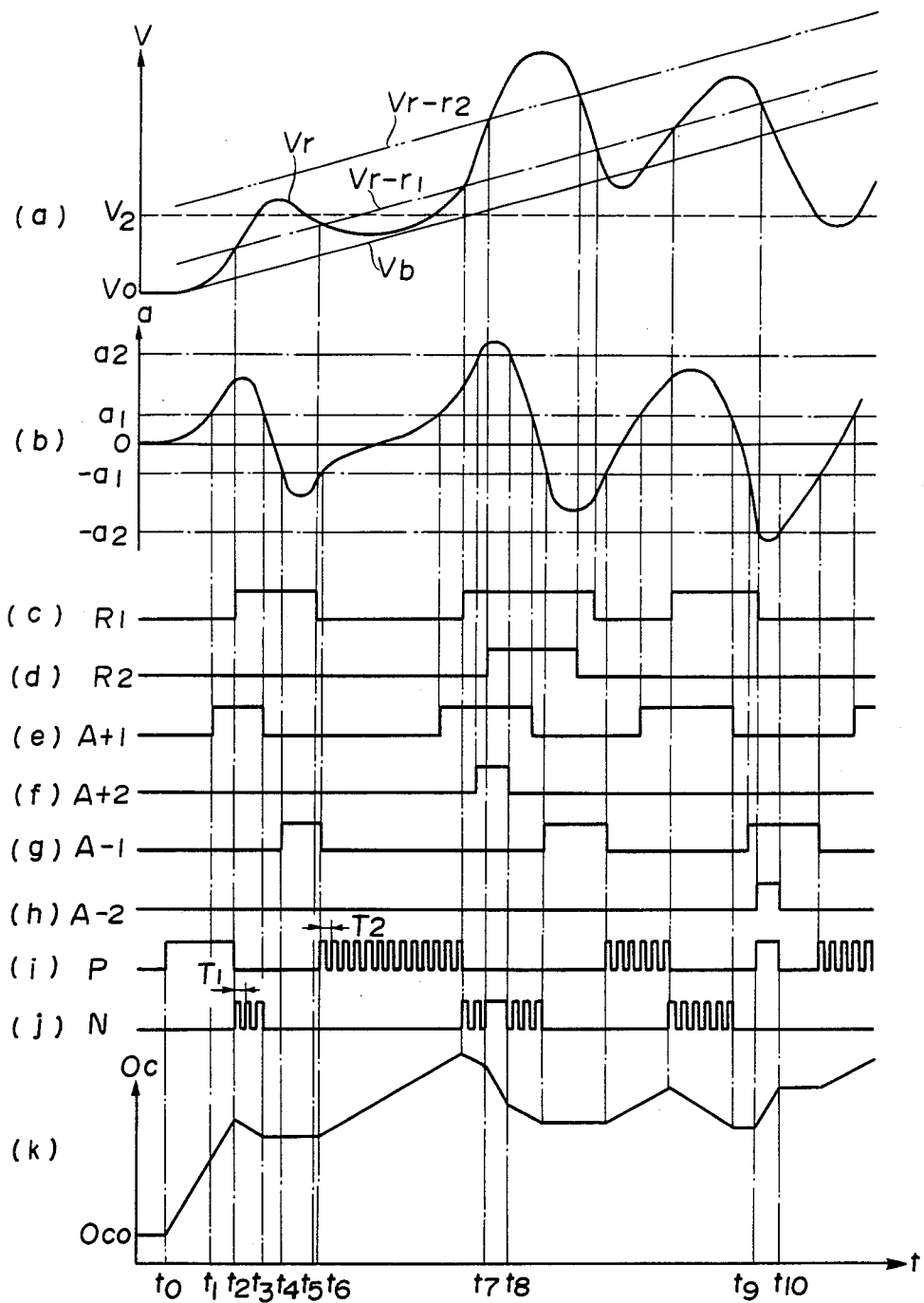
FIG. 9 is a diagrammatic illustration showing waveforms of various signals appearing the control logic circuit.

The anti-slip operation in this embodiment will now be described with reference to FIG. 9 showing the waveforms of the various signals. FIG. 9 shows the process of the anti-slip operation when the acceleration is effected by increasing the throttling amount 0t. In FIG. 9(a), the rear wheel peripheral speed Vr and the estimated vehicle speed Vb derived from the front wheel peripheral speed Vf are shown in solid lines. The rear wheel peripheral speed $V_{r-r1}$, obtained when the slip rate r of the rear wheel 13 is equal to the first reference slip rate $r_1$, is shown in a dot and dash line. Also, the rear wheel peripheral speed $V_{r-r2}$, obtained when the slip rate r is equal to the second reference slip rate $r_2$, is shown in two dots and dash line. The acceleration a is shown in FIG. 9(b). The waveforms of the signals $R_1$, $R_2$, $A_{+1}$, $A_{+2}$, $A_{-1}$, $A_{-2}$, P and N are shown in FIG. 9(a) to FIG. 9(j), respectively. Also, a change in the carburetor throttling amount 0c is shown in FIG. 9(k).

When the mode switch 39 (FIG. 7) is in its closed position to disenable the anti-slip operation, the signal $\overline{CUT}$ is in the 0 state so that the output signal of the AND gate 85 is in the 0 state. Therefore, the output signal of the AND gate 85 is in the 0 state, and the output signals of the NAND gates 95 and 96 are in the 1 state. Therefore, in this case, when the throttling amount 0t is less than or equal to the carburetor throttling amount 0c (0t≦0c) i.e., the signal $\overline{U/D}$ is in the 1 state, the output signal N of the OR gate 91 is rendered "0", so that the carburetor throttling amount 0c is decreased. In contrast, when the throttling amount 0t is greater than the carburetor throttling amount 0c (0t>0c), i.e., the signal $\overline{U/D}$ is in the 0 state, the output signal of the inverter 94 is rendered "1", so that the output signal P of the AND gate 86 is rendered "1", thereby increasing the carburetor throttling amount 0c. Thus, in this case, the carburetor throttling amount 0c is always in synchronism with the throttling amount 0t.

When the mode switch 39 is in its open position to enable the anti-slip operation, the signal $\overline{CUT}$ is in the 1 state. In this case, when the signal $\overline{U/D}$ is in the 1 state, the OR gate 91 is opened and outputs the signal N in the 1 state. Therefore, even in this case, when the throttling amount 0t is decreased, the carburetor throttling amount 0c is decreased in synchronism therewith. The case where the throttling amount 0t is increased will now be described.

It is assumed that the carburetor throttling amount 0c is at a constant level 0co with the motorcycle 10 running at a constant speed V0. When the driver manipulates the throttle grip 37 to increase the throttling amount 0t to accelerate the motorcycle 10 at time $t_0$ (FIG. 9), the signal $\overline{U/D}$ is rendered "0" so that the output signal of the inverter 94 is rendered "1". At this time, the rear wheel 13 is not yet subjected to slip so that the signal R1 and R2 are in the 0 state. Therefore, the output signal of the AND gate 81 is in the 0 state, and the output signals of the NAND gates 95 and 96 are in the 1 state, so that the signal P in the 1 state is outputted from the AND gate 86. During a period between time $t_0$ and time $t_2$, the signal P is held in the 1 state so that the carburetor throttling 0c is increased. As a result, the rear wheel peripheral speed Vr is increased, and therefore the estimated vehicle speed Vb is increased. In this case, at time $t_1$, the acceleration a of the rear wheel 13 exceeds the first reference acceleration $a_1$ so that the signal $A_{+1}$ is changed from the 0 state to the 1 state. Then, at time $t_2$, the speed Vr exceeds the speed $V_{r-r1}$ corresponding to the first reference slip rate $r_1$, that is to say, the slip rate r exceeds the first reference slip rate $r_1$, so that the signal $R_1$ is changed from the 0 state to the 1 state. As a result, the AND gate 80 is opened, and the output signal of the AND gate 81 is rendered "1". Also, the AND gate 82 is opened so that the pulse generator 98 outputs a pulse signal having a period T1. This pulse signal is applied to the AND gate 85 via the OR gate 89 so that the output signal of the AND gate 85 becomes a pulse signal. As a result, the signal N also becomes a pulse signal. Therefore, as shown in FIG. 9, the carburetor throttling amount 0c is gradually decreased by the signal N in the form of a pulse signal, so that the acceleration is decreased.

Then, when the acceleration a is decreased below the first reference acceleration $a_1$ at time $t_3$, the signal $A_{+1}$ is rendered "0" so that the AND gate 82 (FIG. 8) is closed. As a result, the OR gate 91 ceases to output the signal N in the 1 state. Also, at time $t_3$, although the AND gate 80 is closed, the delay circuit 97 continues to output a signal in the 1 state, so that the output signal of the AND gate 81 remains in the 1 state. Also, at time $t_3$, the signal R1 remains in the 1 state, and the signal $A_{-2}$ is in the 0 state so that the output signal of the NAND gate 96 is rendered "0". Therefore, although the output signal of the inverter 94 is in the 1 state, the signal P is rendered "0". Briefly, from time $t_3$, the signals N and P are in the 0 state so that the carburetor throttling amount 0c is maintained. Then, when the acceleration a continues to be decreased and goes negative, as shown in FIG. 9, the speed Vr begins to be decreased. Then, when the acceleration a is decreased below the first reference deceleration $-a_1$ at time $t_4$, the signal $A_{-1}$ is changed from the 0 state to the 1 state, but at this time the control conditions of the carburetor throttling amount 0c are not changed. Then, when the speed Vr is decreased below the speed $V_{r-r1}$ at time $t_5$, the signal $R_1$ is changed from the 1 state to the 0 state, but at this time the control conditions for the carburetor throttling amount 0c are not yet changed since the signal $A_{-1}$ is in the 1 state. Then, when the acceleration a is increased above the first reference deceleration $-a_1$ at time $t_6$, the signal $A_{-1}$ is changed from the 1 state to the 0 state, so that the output signal of the OR gate 90 (FIG. 8) becomes equal to the pulse signal outputted from the pulse generator 99 which pulse signal has a period $T_2$. The pulse generator 99 produces the pulse signal in response to the output signal of the AND gate 81 in the 1 state. Therefore, the output signal of the NAND gate 96 becomes a pulse signal, and the signal P also becomes a pulse signal so that the carburetor throttling amount 0c is gradually increased.

Then, after time $t_6$, the signals P and N are controlled according to the procedure mentioned above to control the carburetor throttling amount 0c. During a period between time $t_7$ and time $t_8$ (FIG. 9), the AND gate 84 (FIG. 8) is opened so that the signal N is rendered "1" in a level manner, thereby decreasing the carburetor throttling amount 0c. During a period between time $t_9$ and time $t_{10}$, the inverter 93 (FIG. 8) outputs the signal in the 0 state so that the NAND gate 96 outputs the signal in the 1 state. At the time, the NAND gate 95 is outputting the signal in the 1 state so that the signal P is rendered "1" in a level manner, thereby increasing the carburetor throttling amount 0c.

As described above, in this embodiment, the slip rate r, the acceleration a and the estimated vehicle speed Vb are used as parameters for controlling the carburetor throttling amount 0c.

Figure 10:
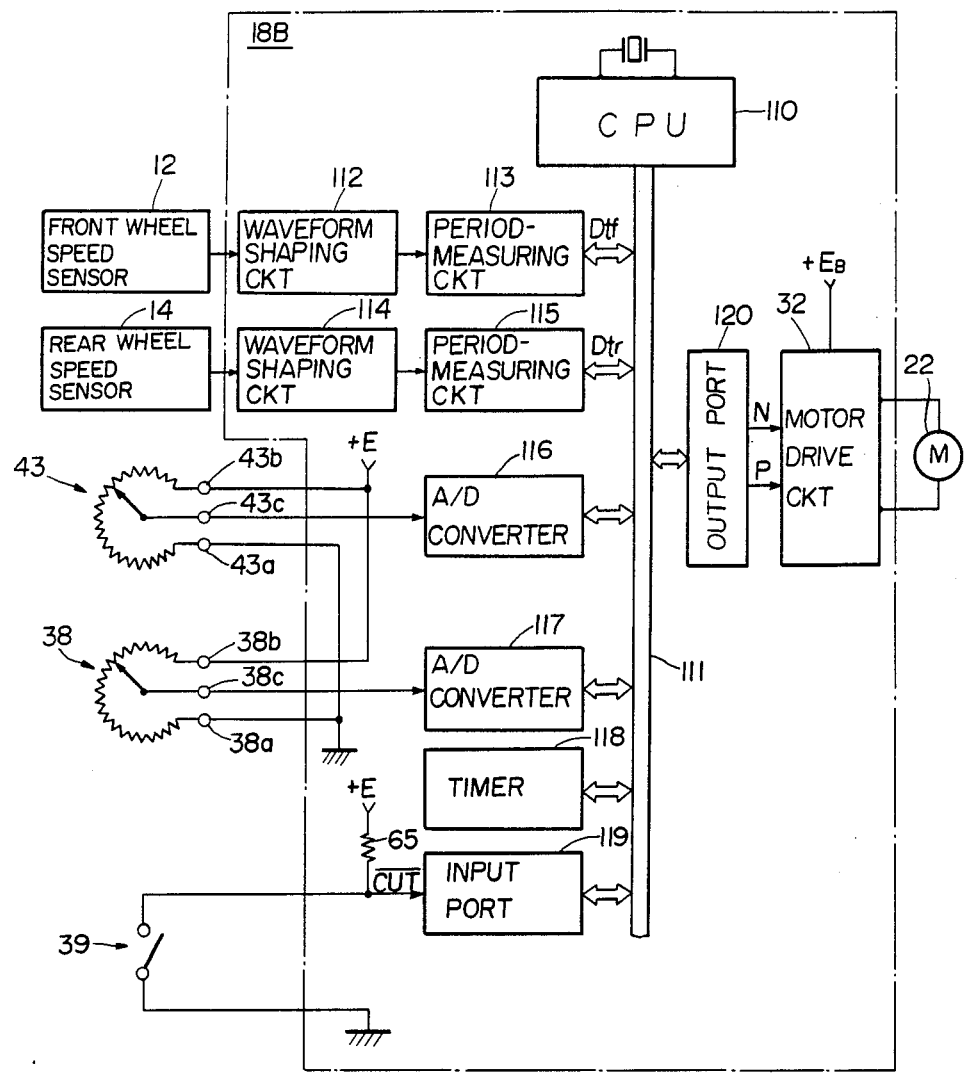
FIG. 10 is a block diagram of another modified anti-slip system.
Figure 11:
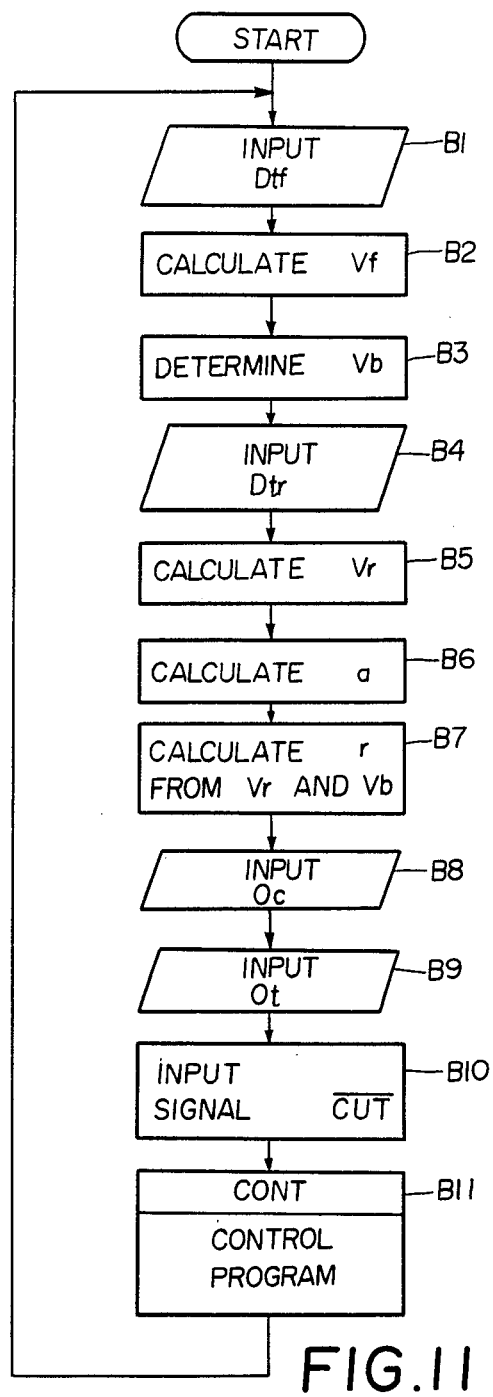
FIGS. 11 and 12 are flow charts of a program for carrying out the anti-slip operation through another modified anti-slip system.
Figure 12:
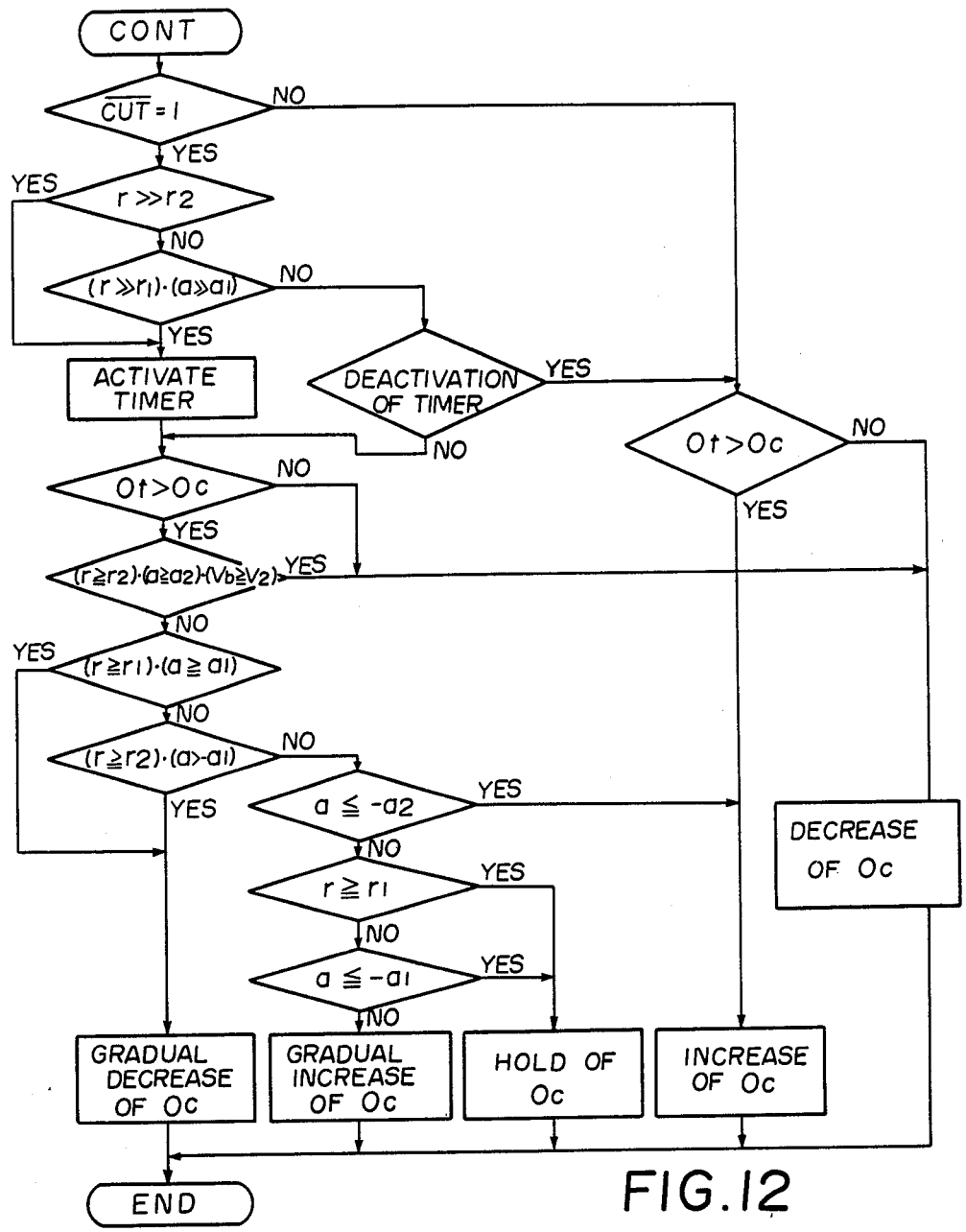

Another modified anti-slip system shown in FIGS. 10 to 12 differs from the anti-slip system shown in FIGS. 5 to 9 in that the control circuit 18A of the control unit 18 is replaced by a control circuit 18B (FIG. 10) using a central processing unit (CPU) 110 in the form of a microprocessor. Therefore, corresponding parts in the preceding embodiment and this embodiment are denoted by like reference characters, and the description thereof will be omitted.

In FIG. 10, the CPU 110 operates in accordance with a program stored in an associated memory (not shown). Reference numeral 111 denotes a data bus of the CPU 110. Connection of the sensors 12, 14, 38, 43, the mode switch 39 and the motor drive circuit 32 to the CPU 110 will now be described. A waveform shaping circuit 112 amplifies the output signal of the front wheel speed sensor 12 in the form of a sinusoidal wave and converts it into a rectangular wave which is applied to a period-measuring circuit 113. The period-measuring circuit 113 comprises a counter and functions to count up clock pulses applied thereto during each cycle of the rectangular wave to output degital period data Dtf which is proportional to a period Tf of the sinusoidal wave outputted from the front wheel speed sensor 12. A waveform shaping circuit 114 and a period-measuring circuit 115 are similar in construction to the waveform shaping circuit 112 and the period-measuring circuit 13, respectively. Therefore, the period-measuring circuit 115 outputs digital period data Dtr which is proportional to a period Tr of the sinusoidal wave outputted from the rear wheel speed sensor 14. An A/D converter (analog-to-digital converter) 116 functions to convert an output voltage of the carburetor throttling sensor 43 into a digital form, and outputs data representative of the carburetor throttling amount 0c. Similarly, an A/D converter 117 outputs data representative of the throttling amount 0t. A timer 118 is operated by the CPU 110 to set a predetermined time interval after which a signal indicative of this time lapse is outputted from the timer 118 to the CPU 110.

The CPU 110 inputs the signal $\overline{\text{CUT}}$ thereto through an input port 119, and outputs the signals N and P through an output port 120.

The operation of the control circuit 18B will now be described with reference to FIGS. 11 and 12 showing flow charts of the program executed by the CPU 110. The program is periodically executed at predetermined time intervals sufficiently short to control the carburetor throttling amount 0c.

When the execution of the program is started, in Block B1 (FIG. 11), the CPU 110 inputs thereto the output data Dtf of the period-measuring circuit 113 corresponding to the period Tf of the output signal of the front wheel speed sensor 12. Then, in Block B2, the CPU 110 calculates the peripheral speed Vf of the front wheel 11 from the period data Dtf. More specifically, since the peripheral speed Vf is proportional to a reciprocal number of the period data Dtf, the CPU 110 calculates the peripheral speed Vf by multiplying the reciprocal number of the period data Dtf by a predetermined constant stored in the associated memory. Then, in Block B3, the CPU 110 averages the peripheral speed Vf by a filtering program stored in the associated memory to determine the estimated vehicle speed Vb. Then, in Blocks B4 and B5, the CPU 110 calculates the peripheral speed Vr of the rear wheel 13 from the output data Dtr of the period-measuring circuit 115 in the same manner as described for Blocks B1 and B2. Then, in Block B6, the CPU calculates the acceleration a of the rear wheel 13 from the peripheral speed Vr, using the above-mentioned formula (3). Then, in Block B7, the CPU 110 calculates the slip rate r of the rear wheel 13 from the peripheral speed Vr and the estimated vehicle speed Vb using the above-mentioned formula (1). Then, in Block B8, the CPU 110 inputs the carburetor throttling amount 0c thereto via the A/D converter 116. Then, in Block B9, the CPU 110 inputs the throttling amount $0_t$ thereto via the A/D converter 117. Then, in Block B10, the CPU 110 inputs the state of the signal $\overline{\text{CUT}}$ thereto via the input port 119. Then, the processing proceeds to Block B11. In Block B11, based on the estimated vehicle speed Vb, the acceleration a, the slip rate r, the carburetor throttling amount 0c, the throttling amount $0_t$, the state of the signal $\overline{\text{CUT}}$, the first and second reference slip rates $r_1$ and $r_2$, the first and second reference accelerations $a_1$ and $a_2$, the first and second decelerations $-a_1$, $-a_2$, and the state of the timer 118, the CPU 110 executes a carburetor throttling amount control program CONT shown in FIG. 12 so that the output port 120 selectively outputs the signals N and P to carry out the anti-slip operation. Then, the processing returns to Block B1. Then, the CPU 110 periodically executes the program in Blocks B1 to B11.

While the anti-slip systems according to the invention have been specifically shown and described herein, the invention itself is not to be restricted to the exact showing of the drawings or the description thereof. For example, although the anti-slip operation is effected by controlling the carburetor throttling in the above-mentioned embodiments, this operation may be effected under the control of the control unit by adjusting the ignition timing of spark plugs of the engine, or by stopping the ignition of one or more of engine cylinders in the case of a multi-cylinder engine, or by imparting a braking force to the drive wheel in accordance with the slip rate.

What is claimed is:

1. In a wheeled vehicle having a drive wheel, a driven wheel, a controllable throttle member, and an engine for driving said driven wheel, said engine throttling amount being responsive to at least said controllable throttle member, an anti-slip system comprising:
- a drive wheel speed sensor for sensing a rotational speed of the drive wheel to produce a first sensing signal;
- a driven wheel speed sensor for sensing a rotational speed of the driven wheel to produce a second sensing signal;
- a throttle position sensor for sensing an operating position of said throttle member for outputting a third sensing signal;
- an engine throttling sensor for sensing said engine throttling amount for outputting a fourth sensing signal;
- a controller comprising a control unit responsive to said first and second sensing signals for outputting a signal representative of a slip rate of the drive wheel and further responsive to said slip rate signal and said third and fourth sensing signals for outputting a control signal; and
- drive control means responsive to said control signal for controlling a drive force of the drive wheel to prevent a predetermined slip thereof.

2. An anti-slip system for a wheeled vehicle according to claim 1, wherein said engine is a carburetor engine and said throttle member is operable to adjust said throttling amount of a carburetor of said engine, and
- wherein said engine throttling sensor is a carburetor throttling sensor for sensing the actual throttling amount of the carburetor to output said fourth sensing signal, and
- wherein said drive control means controls said engine drive force by controlling the throttling amount of the carburetor.

3. An anti-slip system according to claim 1, said controller further comprising
- input means for inputting a reference slip rate signal to said control unit,
- said control unit further comprising means for comparing said slip rate signal with said reference slip rate signal so that said control signal is produced when said slip rate signal is greater than said reference slip rate signal, and
- said drive control means being responsive to said control signal to decrease the drive force of the drive wheel to prevent excess slip over said reference slip rate.

4. In a wheeled vehicle having a drive wheel and a driven wheel, an anti-slip system comprising:
- a drive wheel speed sensor for sensing a rotational speed of the drive wheel to produce a first sensing signal;
- a driven wheel speed sensor for sensing a rotational speed of the driven wheel to produce a second sensing signal;
- a controller comprising means for providing a first reference slip rate signal and a reference acceleration signal,
- said controller further comprising a control unit including means responsive to said first and second sensing signals for providing a slip rate signal, means for differentiating said first sensing signal for providing an acceleration signal of the drive wheel, and means for comparing said slip rate signal and said acceleration signal with said first reference slip rate signal and said reference acceleration signal respectively and producing a control signal when said slip rate signal is greater than said first reference slip rate signal and when said acceleration signal is greater than said reference acceleration signal; and
- drive control means responsive to said control signal for decreasing a drive force of the drive wheel to prevent a predetermined slip thereof.

5. An anti-slip system according to claim 4, said controller further comprising:
- means for providing a second reference slip rate signal greater than said first reference slip rate signal;
- said control unit further comprising means for comparing said slip rate signal with said second reference slip rate signal and also for producing said control signal when said slip rate signal is greater than said second reference slip rate signal.

* * * * *